F. E. AMTHOR.
THERMOMETER.
APPLICATION FILED DEC. 19, 1912.

1,165,564.

Patented Dec. 28, 1915.

WITNESSES
G. R. Quimby
F. B. Graves.

INVENTOR
Fritz E. Amthor
BY
E. W. Marshall
ATTORNEY

UNITED STATES PATENT OFFICE.

FRITZ E. AMTHOR, OF BROOKLYN, NEW YORK, ASSIGNOR TO THE SCHAEFFER & BUDENBERG MFG. CO., OF BROOKLYN, NEW YORK, A CORPORATION OF NEW YORK.

THERMOMETER.

1,165,564.  Specification of Letters Patent.  Patented Dec. 28, 1915.

Application filed December 19, 1912. Serial No. 737,592.

*To all whom it may concern:*

Be it known that I, FRITZ E. AMTHOR, a subject of the Emperor of Germany, and a resident of Brooklyn, county of Kings, and State of New York, have invented certain new and useful Improvements in Thermometers, of which the following is a specification, reference being had to the accompanying drawings, forming a part thereof.

My invention relates to temperature measuring apparatus and particularly to such as embodies remote indicating or recording means suitably connected to an actuating element affected by temperature changes.

The object of my invention is to provide a simple and durable transmitting element for use as a part of a thermometer of the character above indicated, that shall be insulated from temperature changes and from fumes and gases and fully protected against mechanical injury.

I will describe my invention in the following specification and point out the novel features thereof in the appended claim.

Figure 1:
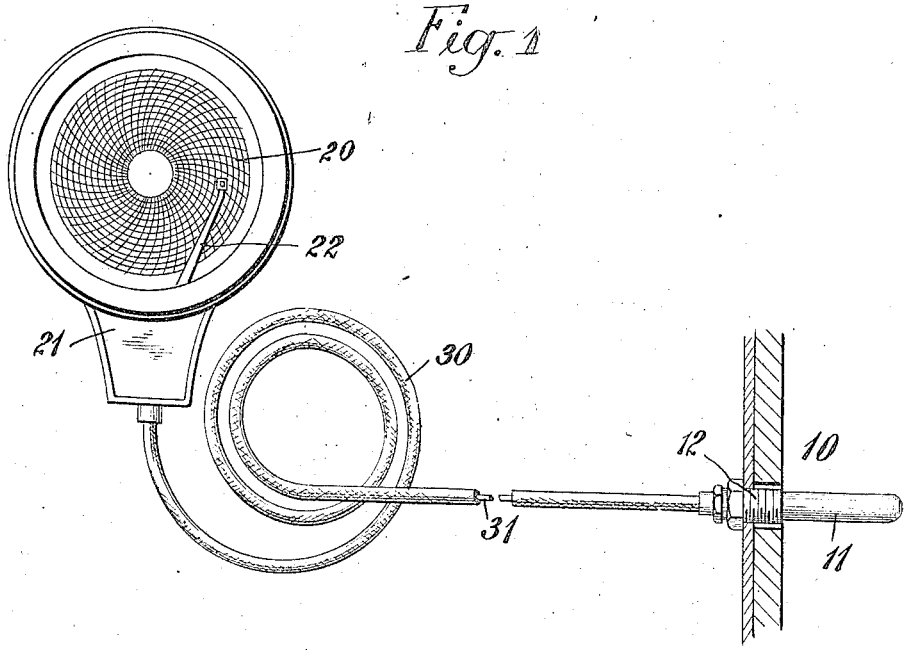
Figure 2:
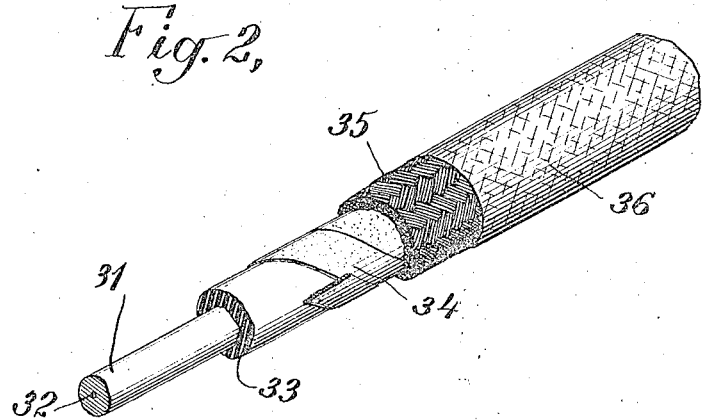

In the drawings,—Figure 1 is an elevation of a thermometer embodying my invention with a part of its novel element broken away to more clearly show its construction. Fig. 2 is a perspective view on a larger scale of a section of the connecting or transmitting element of Fig. 1.

Like characters of reference indicate corresponding parts in all the figures.

Referring to the drawings,—the thermometer here shown comprises a heat responsive pressure element 10, exposed to the medium for which a temperature measurement is desired, an indicating, recording or registering gage or meter element 20 and an interposed connecting or transmitting element 30.

The detailed construction and mounting of the pressure element 10 and the gage or meter element 20 form no part of my present invention and may be determined entirely by the exigencies of any particular case.

For example, the element 10 is shown to comprise a tubular body 11 containing some suitable expansible fluid such as mercury, alcohol or a gas and supported by a wall socket or fastener 12. The meter element has a pressure chamber within the part 21 and a responsive pointer, index or stylus 22.

My invention resides in the combination with the other parts of the thermometer of the connecting or transmitting element 30 which comprises a preferably flexible conducting wire or rod 31 having a very small longitudinal hole 32 which may be described by stating that it is of capillary dimensions.

The life of the instrument and accuracy of its registration depend very largely upon the structure of, and protection which is afforded the transmitting element, consequently I have covered the tube 31 with a close jacket of such material or materials as are best adapted to annul the effect of outside influences.

For example, the tube bay be covered with an inner layer 33 of rubber or like material which contacts with its surface, a spiral tape covering 34 of fabric treated with varnish, oil or gum placed over this layer, over which may be a tubular woven sleeve 35 and an outer flame-proof coating 36 which may be formed of asbestos.

The covering is determined and applied with a view to preventing gases such as are encountered near blast furnaces, refrigerating plants or the like, fumes or moisture, from penetrating the cover and chemically attacking the tube as well as to provide protection against physical injury.

The size of the opening through the wire is preferably but not necessarily minute, so that but an extremely small amount of the fluid contained in the thermometer tube 11 can enter the transmission element, thus minimizing the effect of temperature changes upon the tube itself. But the close protective cover insulates whatever fluid is in the tube from the temperature of the surrounding element.

The fact that the connecting or transmitting element is flexible and when bent or twisted does not reduce the effectiveness of the covering, is a feature which makes my invention particularly desirable. A loose protective sleeve or shell of relatively large diameter such as has heretofore been used has on the contrary the disadvantage of permitting the transmitting tube to approach or make contact with its inside walls at some points while it is widely separated therefrom at other points. The fact that moisture will form inside of pipes, tubes, and the like, when exposed to the atmosphere is well known and such coverings also allow outside gases to enter the space around 11 the transmitting member and to attack the material of which it is constructed.

What I claim is:

A transmitting element adapted to be interposed between an actuating element influenced by temperature and a gaging or metering element, and comprising a flexible metal wire having a coextensive longitudinal opening of very small diameter relative to the diameter of the wire, and a closely adhering heat insulating covering composed of a rubber covering adjacent to the wire, a spiral tape covering of gum treated fabric placed over the rubber, a tubular woven sleeve over the tape and an outer coating of asbestos whereby the outer surface of the wire is protected against chemical and physical injury and the formation of moisture adjacent to the surface of the wire is precluded.

In witness whereof, I have hereunto set my hand this 18 day of December in the year 1912.

FRITZ E. AMTHOR.

Witnesses:
 F. GRAVES,
 G. R. QUIMBY.